(12) United States Patent
Biesty et al.

(10) Patent No.: US 11,959,832 B1
(45) Date of Patent: Apr. 16, 2024

(54) COAXIAL SENSOR ARRAY SYSTEM FOR SUBSURFACE ANOMALIES DETECTION

(71) Applicant: Digital Water Solutions Inc., Guelph (CA)

(72) Inventors: David Neil Biesty, Waterloo (CA); Timothy John Sutherns, Guelph (CA)

(73) Assignee: Digital Water Solutions, Inc., Guelph (CA)

( * ) Notice: Subject to any disclaimer, the term of this patent is extended or adjusted under 35 U.S.C. 154(b) by 0 days.

(21) Appl. No.: 18/334,945

(22) Filed: Jun. 14, 2023

(51) Int. Cl.
| | |
|---|---|
| *G01M 3/24* | (2006.01) |
| *G01L 19/14* | (2006.01) |
| *G01M 3/28* | (2006.01) |
| *H04R 1/44* | (2006.01) |

(52) U.S. Cl.
CPC .......... *G01M 3/243* (2013.01); *G01M 3/2815* (2013.01); *G01L 19/149* (2013.01); *H04R 1/44* (2013.01)

(58) Field of Classification Search
CPC .... G01M 3/00; G01M 3/24–28; G01M 3/243; G01M 3/2815; G01L 19/00; G01L 19/14; G01L 19/149; H04R 1/44
See application file for complete search history.

(56) References Cited

U.S. PATENT DOCUMENTS

| | | | |
|---|---|---|---|
| 2018/0217023 A1* | 8/2018 | Hansen | G01M 3/246 |
| 2022/0276116 A1* | 9/2022 | Sadovnychiy | G01M 3/243 |

FOREIGN PATENT DOCUMENTS

| | | | | |
|---|---|---|---|---|
| DE | 102012002643 A1 * | 8/2013 | | F17D 5/02 |

* cited by examiner

*Primary Examiner* — Nguyen Q. Ha
(74) *Attorney, Agent, or Firm* — Michael D. Eisenberg

(57) ABSTRACT

A coaxial sensor array system configured for prediction of leaks in a water distribution network based on data acquired from coaxial sensor array including: at least one hydrophone; a hydrophone mount configured to house the at least one hydrophone; a pressure transducer configured to measure pressure of a water column within which the plurality of hydrophones is submerged; a pressure transducer mount implemented as a lead-free brass disc configured for fitment of the pressure transducer; an electrical connector configured to connect communication cables to the pressure transducer; a sensor housing configured to house the at least one hydrophone and the pressure transducer; and an end cap configured to seal a back end of the coaxial sensor array system and further configured to allow communications to pass through into a watertight shielded flexible conduit.

13 Claims, 3 Drawing Sheets

COAXIAL SENSOR ARRAY SYSTEM FOR SUBSURFACE ANOMALIES DETECTION

FIELD OF DISCLOSURE

This application generally relates to monitoring current state of liquids within a liquid distribution system, and more particularly, to coaxial sensor array system used for prediction of subsurface anomalies based on data acquired from coaxial sensor array located within a liquid distribution network.

BACKGROUND

Real-time models of fluid flow in a water column can be used to find the location of a leak in the water column or to predict damage to the water column. With respect to Water Distribution Networks (WDN) owners/operators, mitigating water losses due to non-surfacing leaks is a big and expensive challenge. Detection of non-surfacing leaks is challenging since these networks are below grade, and many WDNs do not have the necessary sensing throughout to detect these leaks.

Existing detection systems predominantly use vibration-based acoustics. However, the existing solutions performs poorly in PVC water column networks. Even if the WDN modeling is used, it would lack autonomous monitoring solutions that encompass leak detection and localization. The existing solutions require some form of additional information such as GIS, SCADA and hydraulic maps, or expert knowledge for model training/parameter tuning. These constraints prevent the deployment of these solutions on the WDNs where the required information is not available. Furthermore, the constraints of the existing solutions limit the scalability of these leak localization solutions.

Commonly, with respect to detection of non-surfacing leaks, non-continuous or manual methods are used. These methods may include:
  Ground sweeps with leak-finding equipment;
  Probes (in-water column guided surveys);
  Temporary sensor-based solutions.
In less common situations, continuous monitoring methods may be used. These methods may include:
  Pressure-only solutions (typically, can only detect significant breaks but cannot detect ongoing leaks;
  Acoustic solutions (acoustic in these cases typically refers to the use of vibration sensors either mounted above-grade, or on/within the fire hydrant enclosure and usually not within the water column).

In summary, the existing leak or anomalies detection and localization solutions do not provide equipment for self-sufficient, continuous monitoring leak detection and localization that can be deployed autonomously. The existing sensing solutions—particularly those employing a plurality of sensors—are often limited depending on where they can be deployed within the water distribution network due to their sheer size or form factor.

As such, what is needed is a coaxial sensor array that provides data for effective solution that may be used for autonomous accurate prediction and localization of subsurface anomalies within the WDNs.

SUMMARY

One example embodiment provides a coaxial sensor array system configured for prediction of subsurface anomalies in a water distribution network (WDN) based on data acquired from coaxial sensor array including: a plurality of hydrophones arranged into coaxial array; a hydrophone mount configured to house the plurality of hydrophones; a pressure transducer configured to measure pressure of a water column within which the plurality of hydrophones is submerged; a pressure transducer mount implemented as a lead-free brass disc configured for fitment of the pressure transducer; at least one locking screw having a ring configured to secure the pressure transducer mount; an electrical connector configured to connect communication cables to the pressure transducer; a sensor housing configured to house the plurality of hydrophones; and an end cap configured to seal a back end of the coaxial sensor array system and further configured to allow communications to pass through into a watertight shielded flexible conduit.

Another example embodiment provides a method for subsurface anomalies detection in a water distribution network (WDN) including obtaining a coaxial sensor array system that includes a plurality of hydrophones arranged into coaxial array; at least one hydrophone mount configured to house the plurality of hydrophones; a pressure transducer configured to measure pressure of a water column within which the plurality of hydrophones is submerged; a pressure transducer mount implemented as a lead-free brass disc configured for fitment of the pressure transducer; at least one locking screw comprising a ring configured to secure the pressure transducer mount; an electrical connector configured to connect communication cables to the pressure transducer; a sensor housing configured to house the plurality of hydrophones; and an end cap configured to seal a back end of the coaxial sensor array system and further configured to allow communications to pass through into a watertight shielded flexible conduit; and acquiring data from the coaxial sensor array system to detect subsurface anomalies in the WDN.

DETAILED DESCRIPTION

Figure 1A:
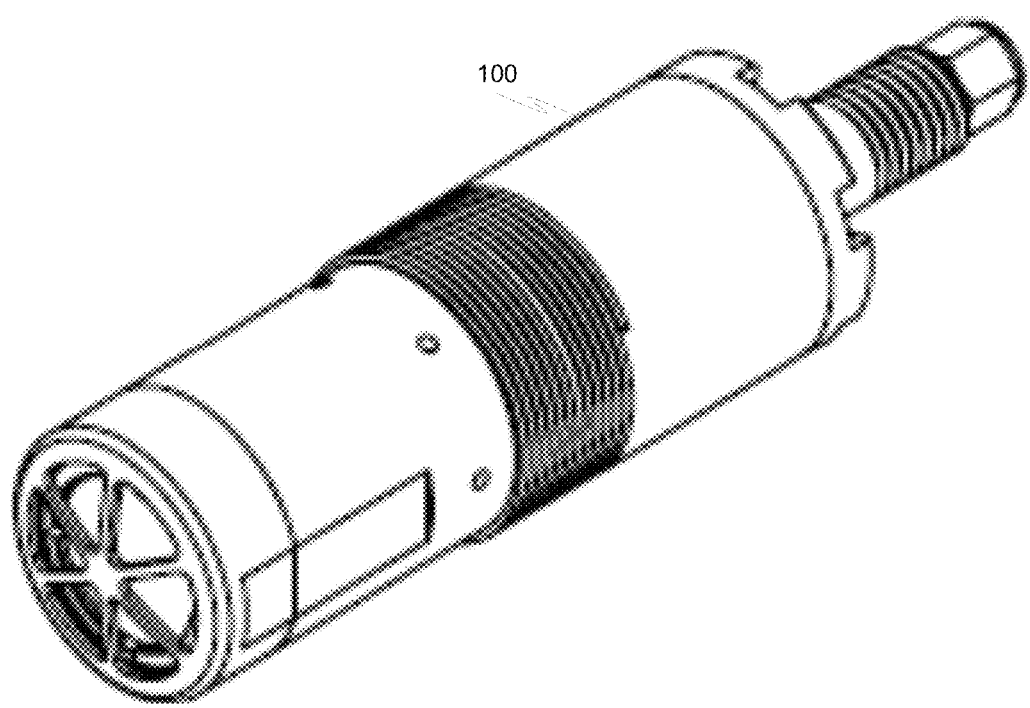
FIG. 1A illustrates a coaxial sensor array system in a fully assembled state used for subsurface anomalies detection and localization, according to the disclosed embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Example embodiments provide a coaxial sensor array system which may provide hydrophone data for detection and localization of leaks in WDNs.

The example embodiments may provide for a novel use of hydrophone data for autonomous subsurface anomalies detection and localization. The system employing the coaxial sensor (hydrophone) array for subsurface anomalies detection and localization may be fully self-sufficient and autonomous due to employment of processing that utilizes hydrophone data for subsurface anomalies detection and localization.

As discussed above, the existing sensing solutions—particularly those employing a plurality of sensors—are often limited depending on where they can be deployed within the WDN due to their sheer size or form factor. The coaxial design disclosed herein, advantageously, circumvents this by providing an extremely compact and slim form factor, which enables the device to be deployed in a number different locations within the WDN beyond the fire hydrants.

FIG. 1A illustrates a coaxial sensor array system in a fully assembled state used for subsurface anomalies detection and localization, according to the disclosed embodiments. The system 100 includes a hydrophone array located inside at the left end of the system 100 assembly.

Figure 1B:
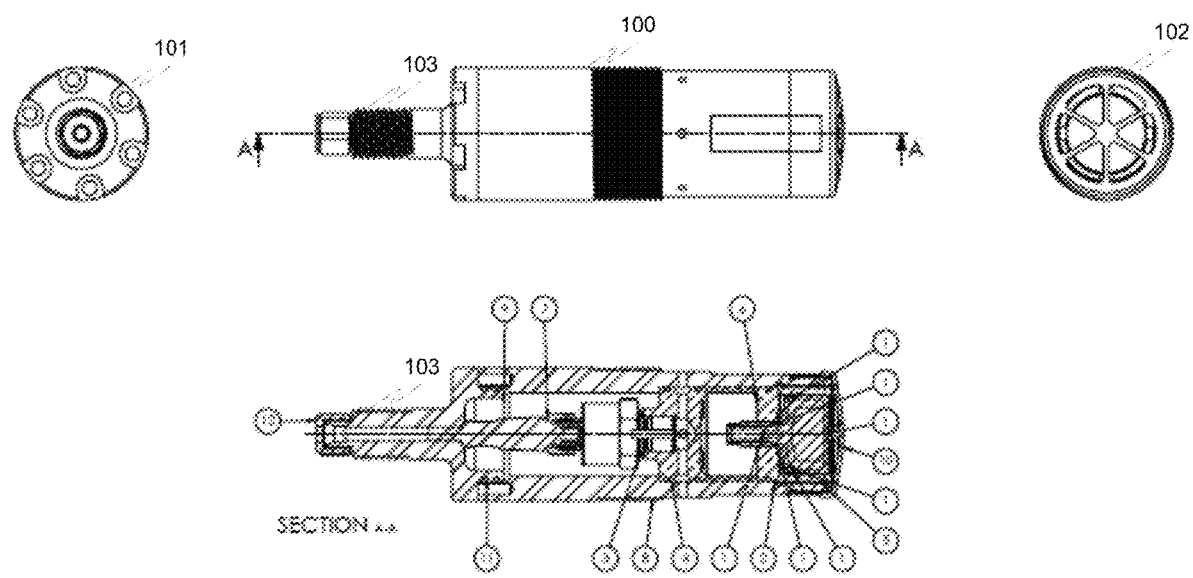
FIG. 1B illustrates a side view and a cross section view of the coaxial sensor array system used for subsurface anomalies detection and localization, according to the disclosed embodiments.

FIG. 1B illustrates a side view and a cross-section view of the coaxial sensor array system 100 used for subsurface anomalies detection and localization, according to the disclosed embodiments.

Referring to the cross-section A-A, an item 1 is hydrophone—i.e., a custom made underwater acoustic listening device.

Item 2 is a hydrophone mount implemented as a lead-free brass disc with machined detail in the center to allow fitment of the hydrophone (item 1), and a groove on the outside diameter to suit a sealing o-ring.

Item 3 is a pressure transducer—i.e., a sensor configured to measure pressure of the water column.

Item 4 is a pressure transducer mount implemented as a lead-free brass disc with machined detail in the center to allow fitment of the pressure transducer. Two o-ring grooves on the outside diameter (OD) provide sealing and a groove around the circumference of the part is connected by cross-drilled galleries to the central pressure transducer to enable the transducer to be connected to the water column.

The outer sleeve has features machined into it to allow the medium being measured (be it gaseous or liquid in nature) to pass around the hydrophone 1 and come into contact with the pressure transducer mounted 4 behind. By having the pressure transducer, the hydrophone, and any other transducers, or instrumentation mounted in line, the system 100 has a form factor, which is optimized to be as small as possible, which in turn allows the coaxial sensor array system 100 to be deployed in a very wide range of potential applications.

Item 5 is a locking screw implemented as a lead-free brass threaded ring configured to contain two transducers and their respective mounting hardware into the array.

Item 6 is a spacer implemented as a tubular piece designed to maintain a set distance between the two transducer assemblies.

Item 7 is implemented as a proprietary electrical connector to connect communication cables to the pressure transducer.

Item 8 is a sensor housing—i.e., a main body of a sensor array. The sensor housing may be made from 316L stainless steel or any corrosion resistant/water safe materials and having a multiplicity of mounting options on the outside diameter (such as 2" UNF thread, 2" NPT tapered thread, or SAE style flange). The sensor housing also has cross drillings in its OD to allow water column to connect to the pressure transducer assembly inside it.

Item 9 is an end cap implemented as 316L stainless steel part to seal the back end of the device whilst allowing communications to pass through into a watertight shielded flexible conduit.

Item 10 is a hydrophone fairing implemented as an acoustically transparent shield to protect the delicate hydrophone from mechanical damage without impeding its acoustic sensitivity.

Item 11 is an o-ring implemented as Buna N food safe o-ring to provide seals to critical internal components.

Item 12 is a compression nut to attach (and seal) flexible electrical conduit to rear of array.

Referring to element 103, the mounting unit provides mounting of the coaxial sensor array system 100 within the WDN. The element 103 can be configured to enable the co-axial device to be mechanically fastened to various elements within the WDN. Some examples of this mounting may include mounting of the coaxial array to the lower operating rod of a dry barrel fire hydrant or mounting of the coaxial array through a tap on a pipe.

Figure 2:
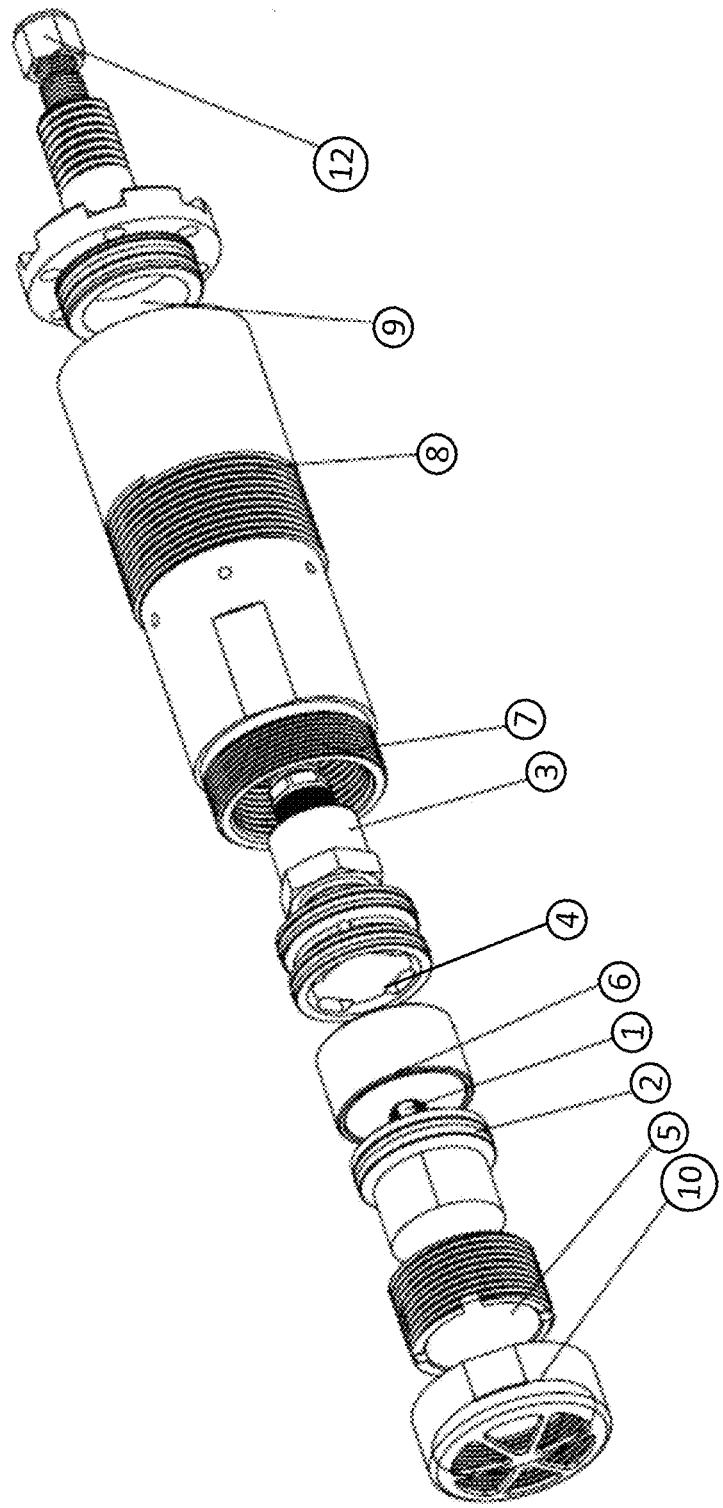
FIG. 2 illustrates an exploded view of the coaxial sensor array according to the disclosed embodiments.

FIG. 2 illustrates an exploded view of the coaxial sensor array according to the disclosed embodiments.

Item 1 is hydrophone—i.e., a custom made underwater acoustic listening device.

Item 2 is a hydrophone mount implemented as a lead-free brass disc with machined detail in the center to allow fitment of the hydrophone (item 1), and a groove on the outside diameter to suit a sealing o-ring.

Item 3 is a pressure transducer—i.e., a sensor configured to measure pressure of the water column.

Item 4 is a pressure transducer mount implemented as a lead-free brass disc with machined detail in the center to allow fitment of the pressure transducer. Two o-ring grooves on the outside diameter (OD) provide sealing and a groove around the circumference of the part is connected by cross-drilled galleries to the central pressure transducer to enable the transducer to be connected to the water column.

Item 5 is a locking screw implemented as a lead-free brass threaded ring configured to contain the two transducers and their respective mounting hardware into the array.

Item 6 is a spacer implemented as a tubular piece designed to maintain a set distance between the two transducer assemblies.

Item 7 is implemented as a proprietary electrical connector to connect communication cables to the pressure transducer.

Item 8 is a sensor housing—i.e., a main body of a sensor array. The sensor housing may be made from 316L stainless steel or any water safe material and having a multiplicity of mounting options on the outside diameter (such as 2" UNF thread, 2" NPT tapered thread, or SAE style flange). The sensor housing also has cross drillings in its OD to allow water column to connect to the pressure transducer assembly inside it.

Item 9 is an end cap that may be implemented as 316L stainless steel part or any other water safe material to seal the back end of the device whilst allowing communications to pass through into a watertight shielded flexible conduit.

Item 10 is a hydrophone fairing implemented as an acoustically transparent shield to protect the delicate hydrophone from mechanical damage without impeding its acoustic sensitivity.

Item 11 is an o-ring implemented as Buna N food safe o-ring to provide seals to critical internal components.

Item 12 is a compression nut to attach (and seal) flexible electrical conduit to rear of array.

Note that the disclosed system in not limited to fluids and liquids, but may include gases. In other words, the disclosed system may be used for detection of anomalies in any medium transmitted through a distribution pipeline.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications thereto.

What is claimed is:

1. A coaxial sensor array system configured for prediction of subsurface anomalies in a water distribution network (WDN) based on data acquired from coaxial sensor array, comprising:
   at least one hydrophone;
   at least one hydrophone mount configured to house the at least one hydrophone;
   a pressure transducer mounted in line with the at least one hydrophone and configured to measure pressure of a water column within which the at least one hydrophone is submerged;
   a pressure transducer mount configured for fitment of the pressure transducer and having galleries configured to lead the water column from the WDN to the pressure transducer;
   an electrical connector configured to connect communication cables to the pressure transducer;
   a sensor housing configured to house the at least one hydrophone and the pressure transducer; and
   an end cap configured to seal a back end of the coaxial sensor array system and further configured to allow communications to pass through into a watertight shielded flexible conduit.

2. The system of claim 1, further comprising a hydrophone fairing comprising an acoustically transparent shield configured to protect the at least one hydrophone from mechanical damage without impeding its acoustic sensitivity.

3. The system of claim 1, further comprising at least one sealing ring.

4. The system of claim 1, further comprising a compression nut configured to attach and seal the watertight shielded flexible conduit to a rear of the at least one hydrophone.

5. The system of claim 1, wherein the pressure transducer mount comprises two o-ring grooves located on an outside diameter to provide sealing and a groove around a circumference of a part connected to the pressure transducer to enable the transducer to be connected to the water column.

6. The system of claim 1, comprising at least one locking screw which comprises a lead-free brass threaded ring configured to contain the pressure transducer, the at least one hydrophone and their respective mounting hardware into an array.

7. The system of claim 6, further comprising a spacer comprising a tubular piece configured to maintain a set distance between the at least one hydrophone and the pressure transducers.

8. The system of claim 1, wherein the sensor housing comprises drillings in its outside diameter to allow water column to connect to the pressure transducer assembly located inside the sensor housing.

9. The system of claim 1, further comprising a mounting element configured to enable the coaxial sensor array system to be mechanically fastened to various elements within the WDN.

10. The system of claim 1, at least one locking screw comprising a ring configured to secure the pressure transducer mount, wherein the at least one locking screw comprises a threaded ring.

11. A method for subsurface anomalies detection in a water distribution network (WDN), comprising:
   obtaining a coaxial sensor array system, comprising:
      at least one hydrophone;
      at least one hydrophone mount configured to house the at least one hydrophone;
      a pressure transducer mounted in line with the at least one hydrophone and configured to measure pressure of a water column within which the at least one hydrophone is submerged;
      a pressure transducer mount implemented as a disc configured for fitment of the pressure transducer and having galleries configured to lead the water column from fie WDN to the pressure transducer;
      an electrical connector configured to connect communication cables to the pressure transducer;
      a sensor housing configured to house the at least one hydrophone and the pressure transducer; and
      an end cap configured to seal a back end of the coaxial sensor array system and further configured to allow communications to pass through into a watertight shielded flexible conduit; and
   acquiring data from the coaxial sensor array system to detect subsurface anomalies in the WDN.

12. A coaxial sensor array system configured for prediction of subsurface anomalies in a water distribution network (WDN) based on data acquired from coaxial sensor array, comprising:
   at least one hydrophone;
   at least one hydrophone mount configured to house the at least one hydrophone;

a pressure transducer configured to measure pressure of a water column within which the at least one hydrophone is submerged;

a pressure transducer mount implemented as a disc configured for fitment of the pressure transducer;

an electrical connector configured to connect communication cables to the pressure transducer;

a sensor housing configured to house the at least one hydrophone;

an end cap configured to seal a back end of the coaxial sensor array system and further configured to allow communications to pass through into a watertight shielded flexible conduit; and and a spacer comprising a tubular piece configured to maintain a set distance between the at least one hydrophone and the pressure transducer.

13. A coaxial sensor array system configured for prediction of subsurface anomalies in a water distribution network (WDN) based on data acquired from coaxial sensor array, comprising:

at least one hydrophone;

at least one hydrophone mount configured to house the at least one hydrophone;

a pressure transducer configured to measure pressure of a water column within which the at least one hydrophone is submerged;

a pressure transducer mount implemented as a disc configured for fitment of the pressure transducer;

an electrical connector configured to connect communication cables to the pressure transducer;

a sensor housing configured to house the at least one hydrophone;

an end cap configured to seal a back end of the coaxial sensor array system and further configured to allow communications to pass through into a watertight shielded flexible conduit; and a mounting element configured to enable the coaxial sensor array system to be mechanically fastened to various elements within the WDN.

* * * * *